United States Patent
Rapp et al.

(10) Patent No.: US 11,220,801 B2
(45) Date of Patent: Jan. 11, 2022

(54) CENTER PINTLE HUB

(71) Applicant: Caterpillar Inc., Deerfield, IL (US)

(72) Inventors: Joe A. Rapp, Vail, AZ (US);
Cheng-Kong C. Wu, Franklin, WI (US); Vladimir A. Korchagin, Tucson, AZ (US); Aruna Kinjarapu, Oro Valley, AZ (US); Robin Varghese, Ernakulam (IN)

(73) Assignee: Caterpillar Global Mining LLC, Tucson, AZ (US)

( * ) Notice: Subject to any disclaimer, the term of this patent is extended or adjusted under 35 U.S.C. 154(b) by 232 days.

(21) Appl. No.: 16/514,807

(22) Filed: Jul. 17, 2019

(65) Prior Publication Data
US 2021/0017735 A1    Jan. 21, 2021

(51) Int. Cl.
*E02F 9/12* (2006.01)
*F16C 11/04* (2006.01)
*E02F 3/30* (2006.01)

(52) U.S. Cl.
CPC .............. *E02F 9/121* (2013.01); *F16C 11/04* (2013.01); *E02F 3/308* (2013.01)

(58) Field of Classification Search
CPC .............. E02F 9/12; E02F 9/121; F16C 11/04
See application file for complete search history.

(56) References Cited

U.S. PATENT DOCUMENTS

| | | | |
|---|---|---|---|
| 2,134,866 A * | 11/1938 | Esters | B66C 23/84 212/253 |
| 4,037,894 A * | 7/1977 | Sankey | B66C 23/84 384/618 |
| 4,231,699 A * | 11/1980 | Thompson | E02F 9/121 414/687 |
| 8,474,160 B1 * | 7/2013 | Thomas | E02F 3/58 37/397 |
| 2005/0172527 A1 | 8/2005 | Mimuro et al. | |
| 2016/0273191 A1 | 9/2016 | Wu et al. | |

FOREIGN PATENT DOCUMENTS

| | | |
|---|---|---|
| CN | 201588246 U | 9/2010 |
| CN | 202899203 U | 4/2013 |
| JP | 2004060778 A | 2/2004 |

* cited by examiner

*Primary Examiner* — Michael P Ferguson
(74) *Attorney, Agent, or Firm* — Procopio, Cory, Hargreaves & Savitch LLP (57) ABSTRACT

A center pintle hub to be affixed to a base of a machine. The center pintle hub includes a base portion and a support portion. The base portion is formed to be affixed to the base. The support portion extends from the base portion and has a frusto-conical shape that can receive a center pintle shaft. The center pintle shaft can support a frame of the machine and provide rotation of the frame with respect to the base.

14 Claims, 7 Drawing Sheets

CENTER PINTLE HUB

TECHNICAL FIELD

The present disclosure generally pertains to machines with revolving frames. More particularly this disclosure is directed toward a center pintle hub for a machine.

BACKGROUND

Swivel work machines, such as excavators, hydraulic shovels, rope shovels, and the like are typically employed in construction and mine sites. Such machines generally include a base (also known as carbody) that is supported by ground-engaging components and is configured to support a revolving frame thereon. In addition, the machines include a swing mechanism that may be directly secured to the frame to rotate the frame relative to the base. The frame is rotatably driven by one or more swing drives of the swing mechanism. The swing mechanism may include a pintle assembly for rotatably coupling the frame to the base. In such an arrangement, the swing mechanism rotates the revolving frame with respect to the base during operation. The pintle assembly is disposed between the frame and the base. The pintle assembly includes a center pintle hub and a center pintle shaft. The center pintle hub is welded to the base and is structured to support and accommodate a lower end of the center pintle shaft. An upper end of the center pintle shaft is attached to the frame via fasteners. During operation, the swing mechanism rotates the center pintle shaft that rotates the frame with respect to the base.

Typically, the center pintle hub is composed of multiple welded pieces, which could be standard rolled or forged pieces of consistently high strength. For secure attachment of the center pintle hub to the frame, it is required that each piece of the center pintle hub is welded to the frame. Welding of multiple pieces of the center pintle hub to the base poses difficulty to manufacturers in the welding process as the pieces are located in difficult to access positions. The conventional design may limit the load-bearing strength of the center pintle hub, as welding of multiple pieces may cause onset of fracture upon under operation loads. In addition, welding of multiple pieces may reduce durability of the center pintle hub due to multiple welded joints.

U.S. Patent Publication No. 2016/273,191 to Wu et. al. describes a center pintle hub coupled to a base of a machine. The center pintle hub is casted as a single piece. The center pintle hub includes a disc, a hole, a plurality of protrusions, a cylindrical member, and a plurality of stiffening members. The disc couples to the base and includes a first surface and a second surface. The hole extends from the first surface to the second surface, along a central axis of the disc. The plurality of protrusions, disposed on the second surface, is arranged in an array of square configuration. The plurality of protrusions extends from the second surface and attach to a plurality of stiffeners of the base. The hollow cylindrical member is coupled to the first surface and arranged coaxially with the hole of the disc. The plurality of stiffening members is circumferentially disposed and equally spaced around the hollow cylindrical member.

The present disclosure is directed toward overcoming one or more of the problems discovered by the inventors or that are known in the art.

SUMMARY

A center pintle hub for a machine having a base is disclosed herein. The center pintle hub includes a base portion formed to be affixed to the base of the machine and a support portion extending from the base portion. The support portion has a frusto-conical shape. The support portion having a bottom portion located adjacent to the base portion and a top portion extending from the bottom portion away from the base portion. The top portion located inward of the bottom portion. The top portion includes a top surface located opposite the base portion. The support portion further including a bore extending through the support portion, located inward of the top surface and having an inner surface located inward of the top surface and formed to receive a center pintle shaft of the center pintle assembly.

In another embodiment, the center pintle hub includes a base portion having an annular shape and a support portion extending from the base portion. The support portion includes a bottom portion located adjacent to the base portion and a top portion extending from proximate to the bottom portion and shaped as a truncated conical shaped solid of revolution. The top portion includes a top surface located opposite the base portion. The center pintle hub further including a bottom surface located opposite of the top surface and an inner surface defining a bore located inward of the top surface, extending from adjacent the top surface to adjacent the bottom surface.

In another embodiment the center pintle hub includes a base portion and a support portion extending from the base portion. The support portion having a top surface located opposite the base portion, and an outer surface defining a conical shape extending from the top surface to proximate the base portion. The center pintle hub further includes a bottom surface located opposite of the top surface, and an inner surface surrounding a bore extending through the support portion from adjacent the top surface to adjacent the bottom surface.

BRIEF DESCRIPTION OF THE FIGURES

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent that those skilled in the art will be able to understand the disclosure without these specific details. In some instances, well-known structures and components are shown in simplified form for brevity of description. Furthermore, some of the features and surfaces have been left out or exaggerated for clarity and ease of explanation.

Figure 1:
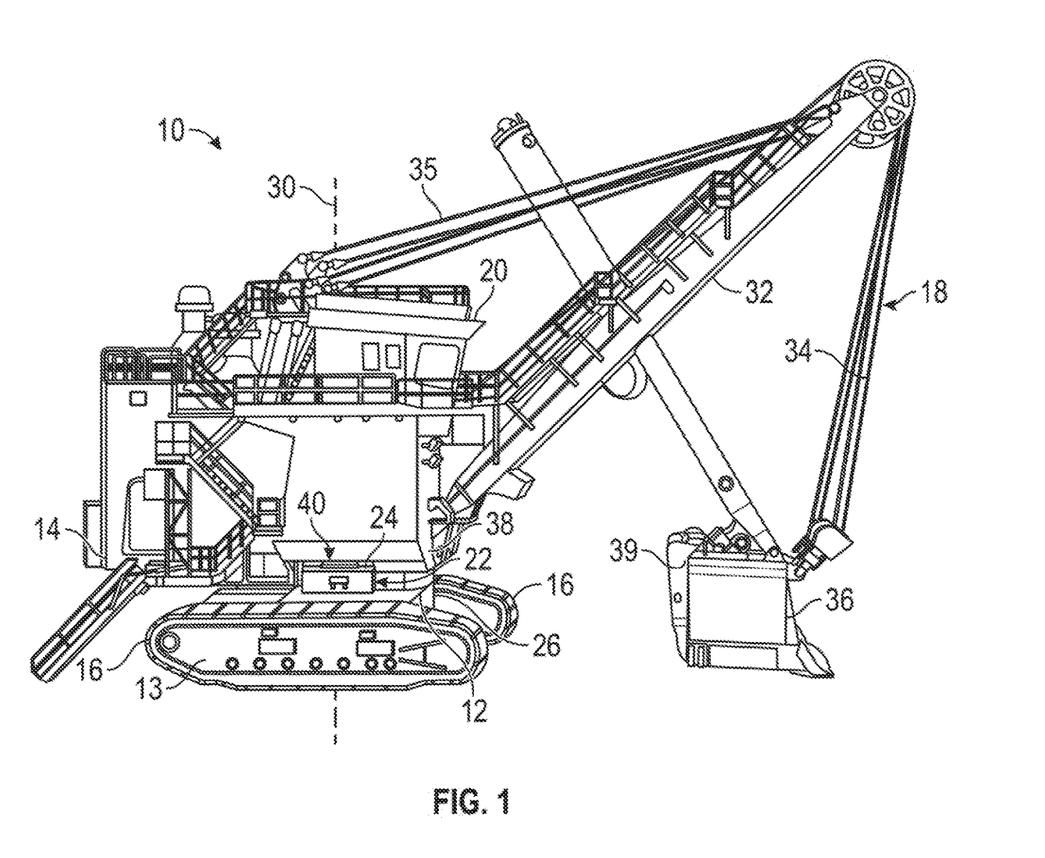
FIG. 1 is an illustration of a rope shovel as an exemplary machine.

FIG. 1 is an illustration of a rope shovel as an exemplary machine. As used herein, the term "machine" may refer to any machine that performs some type of operation associated with an industry such as mining, construction, transportation, marine, or any other industry known in the art.

The machine 10 may include a base 12, a frame 14, a pair of crawler tracks 16, an implement assembly 18, an operator station 20, and a swing drive assembly 22. The base 12 supports movement of the machine 10. The base 12 includes a top portion 24 and two lateral surfaces 26. The top portion 24 of the base 12 is configured to support the frame 14 thereon. The base 12 may also be referred by term "car-body."

Each of the pair of the crawler tracks 16 include a track roller frame 13, thereby making a pair of track roller frames 13. The track roller frames 13 are attached to the lateral surfaces 26 of the base 12, thereby supporting the base 12. The crawler tracks 16 are moved by sprockets (not shown) that are powered by a prime mover (not shown) supported by the frame 14. In the disclosed exemplary application, the base 12 is movable, with the crawler tracks 16 that are driven to propel the machine 10 over a work surface.

Figure 2:
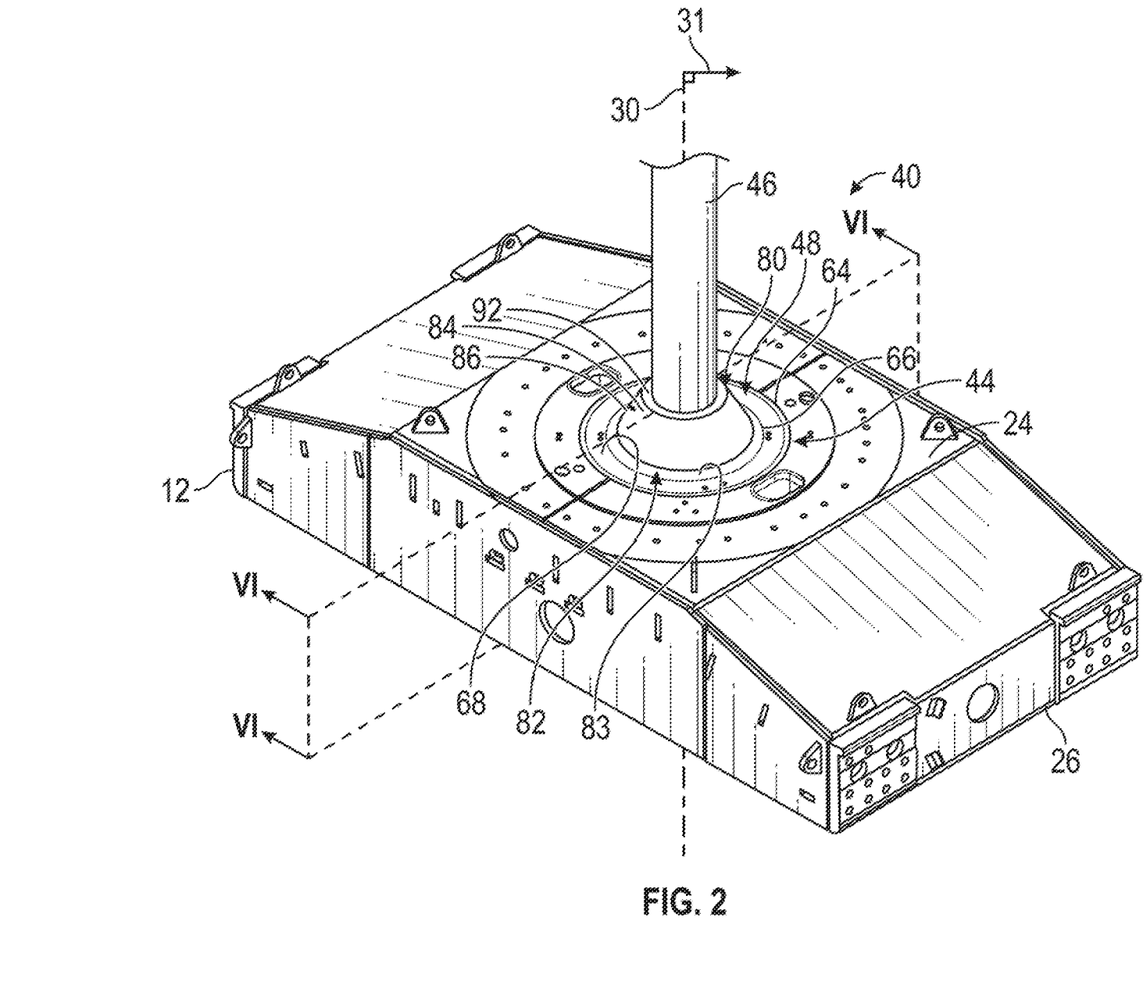
FIG. 2 is a perspective view of a center pintle assembly mounted to the base of an exemplary machine.

In addition, the disclosure may generally reference a center pintle axis 30 located at a center point of the center pintle hub 44 (shown in FIG. 2) and longitudinal to the center pintle shaft 46 (shown in FIG. 2). The center pintle axis 30 may be common to or shared with various other machine concentric components. All references to radial, axial, and circumferential directions and measures refer to center pintle axis 30, unless specified otherwise. Terms such as "inner" and "outer" generally indicate a lesser or greater radial distance from, wherein a radial 31 (shown in FIG. 2) may be in any direction perpendicular and radiating outward from center pintle axis 30.

The frame 14 is supported on the base 12. The frame 14 supports the implement assembly 18, the operator station 20, and the swing drive assembly 22. The frame 14 pivots relative to the base 12, about the center pintle axis 30. As the frame 14 pivots about the center pintle axis 30, the implement assembly 18 and the operator station 20 also pivot together with the frame 14. This changes an angular position of the implement assembly 18 relative to the base 12.

Rotation of the frame 14 allows the implement assembly 18 to rotate about the center pintle axis 30 of the base 12. This allows the implement assembly 18 to perform various functions such as transporting dirt or other mining material after scooping the same from the work surface. The implement assembly 18 includes a boom 32, a set of hoist cables 34, a set of suspension cables 35, and an implement 36. The boom 32 may be pivotally connected at a front end 38 of the frame 14. The boom 32 may be constrained at a desired vertical angle relative to work surface, by the suspension cables 35. The hoist cables 34 connect the implement 36 to the frame 14.

In the illustrated embodiment of FIG. 1, the implement 36 is a dipper. The dipper is a type of shovel bucket having a pivotal door 39. Reeling in and spooling out of the hoist cables 34 may affect a height and angle of the implement 36 relative to the work surface. Although the dipper is depicted in FIG. 1, in other embodiments, the implement 36 may alternatively embody a grapple bucket, a blade ripper, a breaker, an auger, and the like. Therefore, it is to be noted that a type of the implement 36 used is merely exemplary in nature and hence, non-limiting of this disclosure. The type of implement 36 used may vary from one application to another depending on specific requirements of an application.

The operator station 20 is rigidly mounted on the frame 14. The operator station 20 allows an operator to control the implement assembly 18 and the swing drive assembly 22. The operator station 20 may include one or more operator interface devices (not shown) for example a joystick, a steering wheel, user interfaces, indicators, or a pedal (none of which are shown but are well known in the art). Movement of the operator interface devices may initiate movement of the crawler tracks 16, the implement 36, and the swing drive assembly 22, by producing displacement signals that are indicative of desired maneuvering.

The swing drive assembly 22 of the machine 10 rotatably connects the base 12 and the frame 14, in order to facilitate rotation of the frame 14 relative to the base 12. The swing drive assembly 22 includes a center pintle assembly 40 to facilitate a 360-degree rotation of the frame 14 relative to the base 12. The swing drive assembly 22 may additionally include one or more swing motors, a swing gear, rollers, and other components (none of which are shown but are well known in the art).

FIG. 2 is a perspective view of the center pintle assembly 40 mounted to the base 12. For the following description, reference can also be made to FIG. 3 and FIG. 4 in addition to FIG. 2. The top portion 24 of the base 12 includes a mounting location for the center pintle assembly 40 proximate to a center of the base 12. The center pintle assembly 40 includes a center pintle hub 44 and a center pintle shaft 46 that both can be centered about the center pintle axis 30.

The center pintle shaft 46 can be shaped to mate with an inner surface 88 of a bore 96 in the center pintle hub 44. The center pintle shaft 46 can counteract horizontal and vertical forces exerted on the frame 14 during shovel operation. An upper end (not shown) of the center pintle shaft 46 can be fixedly attached to the frame 14 (refer to FIG. 1) so as to house a top portion (not shown) of the center pintle shaft 46 inside the frame 14. A lower end of the center pintle shaft 46 is supported inside the base 12 via the center pintle hub 44.

The center pintle hub 44 can be a solid single forged piece, having a frusto-conical shape with a bore 96 extending therethrough. The center pintle hub 44 can include a base portion 48 and a support portion 80. The base portion 48 can be formed to affix the center pintle hub 44 to the base 12. The base portion 48 can be shaped like an annulus centered around the center pintle axis 30. In other examples, the base portion 48 can be shaped similar to a rectangular, pentagon, ellipse, and other geometric shapes. The base portion 48 can include an outer circumference 64, and a first surface 68. The outer circumference 64 can be the most outward edge or portion of the base portion 48 with respect to the center pintle axis 30. The outer circumference 64 can be a surface facing outwards with respect to the center pintle axis 30.

The first surface 68 can extend inwards from the outer circumference 64 on a top or upper side of the base portion 48, such that the first surface 68 faces the frame 14. The base portion 48 may be coupled by welding to the base 12 along the outer circumference 64.

The support portion 80 can have a solid frusto-conical shape with a bore 96 extending through it to receive the center pintle shaft 46 or in other words a solid truncated cone with a bore 96 extending therethrough. The support portion 80 can have a support outer circumference 66, a bottom portion 82, a top portion 84, an outer surface 86, and a top surface 92. The support outer circumference 66 can be the most outward portion of the support portion 80 with respect to the center pintle axis 30. The bottom portion 82 can be located adjacent to the base portion 48. The bottom portion 82 can be wider than the top portion 84 with respect to the center pintle axis 30. The bottom portion 82 can be outward of the top portion 84 with respect to the center pintle axis 30. The bottom portion 82 can have a transition portion 83 that adjoins to the base portion 48 at the support outer circumference 66. The transition portion 83 can have a curvature that transitions the slope change from the base portion 48 to the support portion 80, and may have a constant radius.

The top portion 84 of the support portion 80 can be located opposite of the bottom portion 82. The top portion 84 can be narrower than the bottom portion 82 with respect to the center pintle axis 30. The top portion 84 can be shaped as a conical shaped solid of revolution with respect to the center pintle axis 30.

A top surface 92 can be a surface of the top portion 84 facing away from the base portion 48 and around the center pintle axis 30.

An outer surface 86 can extend from the support outer circumference 66 to the top surface 92. The outer surface 86 can face outward from the center pintle axis 30 and upwards towards the frame 14. A portion of the outer surface 86, extending from the top surface 92 to proximate the base portion 48 can have a single curvature or be linear, which can form a continuous conical shape centered around the center pintle axis 30. In other words, the outer surface 86 can be and outward facing continuous surface forming a conical shape such as a frusto conical. In other embodiments, a portion of the outer surface 86, extending from the top surface 92 to the transition portion 83, can have multiple curvatures, and/or have multiple linear portions.

An inner surface 88 can extend through the center pintle hub 44 around the center pintle axis 30. The inner surface 88 can face inwards towards the center pintle axis 30. The inner surface 88 can be the most inward surface of the center pintle hub 44. The inner surface 88 can form the bore 96 passing through the center pintle hub 44 around the center pintle axis 30. The inner surface 88 can be formed to receive the center pintle shaft 46.

The bottom portion 82 and the top portion 84 can be substantially solid extending from the outer surface 86 to the inner surface 88, shaped as a conical solid of revolution around the center pintle axis 30.

Figure 3:
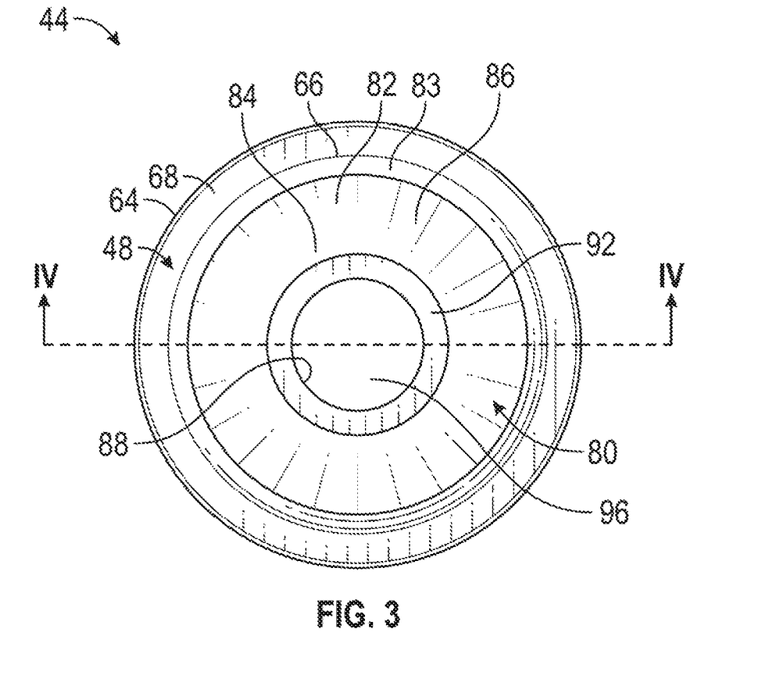
FIG. 3 is a top plan view of the center pintle hub.

FIG. 3 is a top view of the center pintle hub. The outer circumference 64 can be shaped as an annulus centered about the center pintle axis 30. The first surface 68 of the base portion 48 extends inwards from the outer circumference 64 to the support outer circumference 66 and can be shaped as an annulus centered about the center pintle axis 30. The transition portion 83 can extend inwards from the support outer circumference 66. The outer surface 86 can extend inwards from the support outer circumference 66 to the top surface 92. The top surface 92 can extend inwards from the outer surface 86 inwards to the inner surface 88 can be shaped as an annulus centered about the center pintle axis 30.

Figure 4:
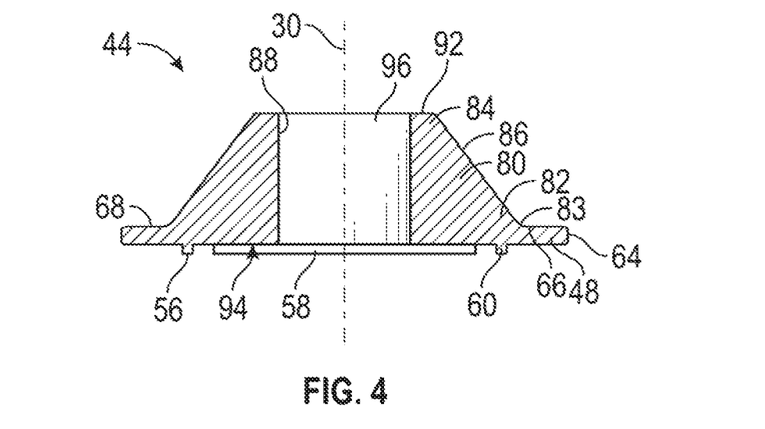
FIG. 4 is a cross-section of the center pintle hub along section line IV-IV of FIG. 3.

FIG. 4 is a cross sectional view of the center pintle hub taken along line Iv-Iv in FIG. 3. The center pintle hub 44 can include a bottom surface 94 located opposite from the top surface 92. The bottom surface 94 can be radially defined between the outer circumference 64 and the inner surface 88, and can be oriented to face downwards towards the base 12. The bottom surface 94 can be the bottom surface of the base portion 48.

The center pintle hub 44 can include a first protrusion 56, a second protrusion 58, and a third protrusion 60 that each extend from the bottom surface 94 away from the support portion 80 and towards the base 12.

Figure 5:
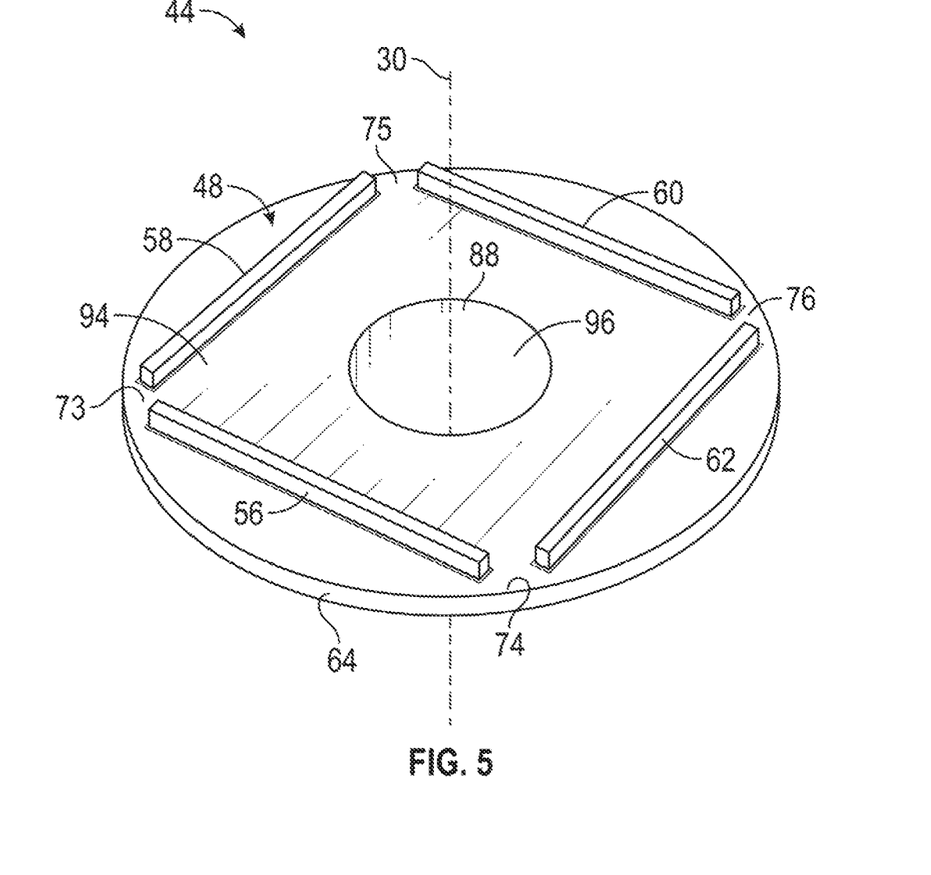
FIG. 5 is a bottom perspective view of the center pintle hub shown in FIG. 3.

FIG. 5 is a bottom perspective view of the center pintle hub. The center pintle hub 44 can further include a fourth protrusion 62. The first protrusion 56, second protrusion 58, third protrusion 60, and fourth protrusion 62 can be referred to as protrusions 56, 58, 60, 62. The protrusions 56, 58, 60, 62 can be disposed and arranged on the bottom surface 94 of the center pintle hub 44. The protrusions 56, 58, 60, and 62 can be arranged in an array of square configuration. Each of the protrusions 56, 58, 60, and 62 can be uniformly distant from the inner surface 88 and center pintle axis 30. Each of the protrusions 56, 58, 60, and 62 can extend downward from the bottom surface 94 towards the base 12. The protrusions 56, 58, 60, and 62 can be substantially bar-shaped. The protrusions 56, 58, 60, and 62 can be similar in dimensions (height, width, and length). The protrusion 56 can be adjacent to the protrusions 58 and 62, thereby defining a first gap 73 and a second gap 74, respectively. In addition, the protrusion 56 can be positioned opposite to the protrusion 60. Similarly, the protrusion 58 can be positioned opposite to the protrusion 62. The protrusion 60 can be adjacent to the protrusions 58 and 62, thereby defining a third gap 75 and a fourth gap 76, respectively. In an example, the protrusions 56, 58, 60, and 62 may be continually attached to each other to form a closed square structure, eliminating the gaps 73, 74, 75, and 76.

Figure 6:
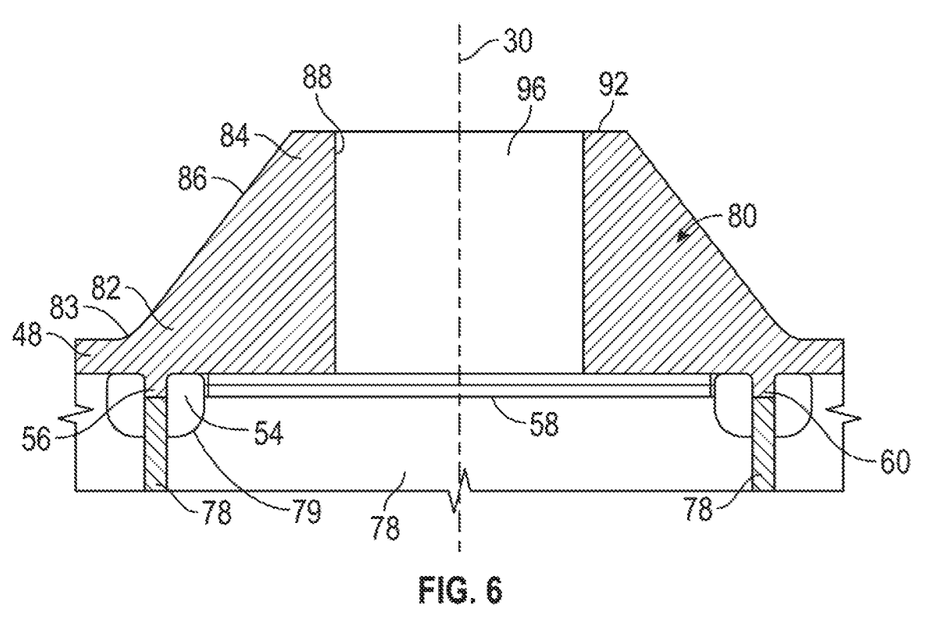
FIG. 6 is a cross-sectional view of a portion of the center pintle hub mounted to a portion of the base taken along section line VI-VI of FIG. 2, the center pintle shaft not shown.

FIG. 6 is a perspective cross-sectional view of a portion of the center pintle hub mounted to a portion of the base along section line VI-VI of FIG. 2, the center pintle shaft not shown. The protrusions 56, 58, 60, and 62 (fourth protrusion 62 not shown in FIG. 6) can be coupled to the base 12, via welding of the protrusions 56, 58, 60, and 62 with a plurality of vertical stiffeners 78. This can facilitate attachment of the center pintle hub 44 to the base 12. Each of the vertical stiffeners 78 can be oriented generally parallel with the center pintle axis 30 and have corner edges 79. The vertical stiffeners 78 can have a "raffle ticket" shape, such as a rectangle with the corners removed. In other words, the corner edges 79 can form rat holes 54 with the proximate bottom surface 94 and the protrusions 56, 58, 60, and 62. The corner edges 79 can be shaped with a curvature (having single or multiple radii), be linear, or a combination of both.

In another alternative embodiment, the center pintle hub 44 may be forged with no protrusions 56, 58, 60, and 62 on the bottom surface 94. Without the protrusions 56, 58, 60, and 62, the bottom surface 94 may be directly welded to the vertical stiffeners 78 of the base 12.

Figure 7:
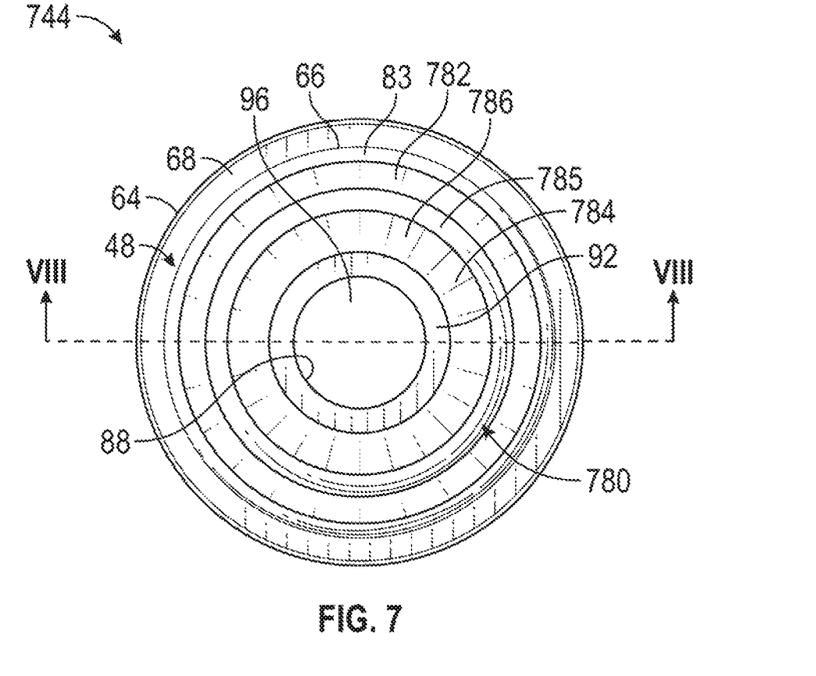
FIG. 7 is a top plan view of an alternative center pintle hub.

FIG. 7 is a top view of an alternative center pintle hub.

Figure 8:
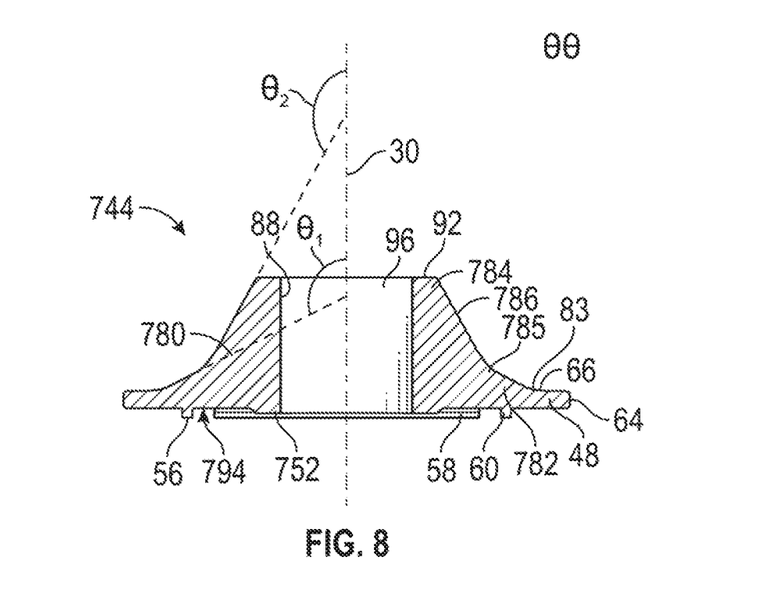
FIG. 8 is a cross-section of the center pintle hub and the base along section line VIII-VIII of FIG. 7.

FIG. 8 is a cross-section of the center pintle hub and the base along section line VIII-VIII of FIG. 7. Structures and features previously described in connection with earlier described embodiments may not be repeated here with the understanding that, when appropriate, that previous description applies to the embodiment depicted in FIG. 7, as well as FIG. 8. Additionally, the emphasis in the following description is on variations of previously introduced features or elements. Also, some reference numbers for previously described features are omitted.

Referring to FIGS. 7 and 8, an alternative center pintle hub 744 can include a base portion 48 and a support portion 780. The support portion 780 can have a bottom portion 782 and a top portion 784. The bottom portion 782 can be located proximate to the base portion 48. The bottom portion 782 can be wider than the top portion 784 with respect to the center pintle axis 30. The bottom portion 782 can be outward of the top portion 784 with respect to the center pintle axis 30. The bottom portion 782 can have a transition portion 83 that adjoins to the base portion 48 at the support outer circumference 66. The transition portion 83 can have a curvature that transitions the slope change from the base portion 48 to the support portion 780, and may have a constant radius. The bottom portion 782 can be shaped to have a bottom portion angle θ1 oriented upwards and with respect to the center pintle axis 30.

The top portion 784 of the support portion 780 can be located opposite of the bottom portion 782 and extend from proximate the bottom portion 782 upwards and inwards towards the center pintle axis 30. The top portion 784 can be narrower than the bottom portion 782 with respect to the center pintle axis 30.

The top portion 784 can have a top portion angle θ2 oriented upwards and with respect to the center pintle axis 30. In an embodiment shown, the bottom portion angle θ1 is smaller than the top portion angle θ2. In other words, the slope of the top portion 784 is steeper than the slope of the bottom portion 782 with respect to the bottom surface 94. In other examples, the bottom portion angle θ1 is greater than the top portion angle θ2.

The support portion 780 can have a middle transition portion 785 adjoining the bottom portion 782 to the top portion 784. The middle transition portion 785 can have a curvature that transitions the slope change from the bottom portion 782 to the top portion 784, and may have a constant radius.

An outer surface 786 can extend from the support outer circumference 66 to the top surface 92. The outer surface 786 can face outward from the center pintle axis 30 and upwards towards the frame 14. The outer surface 786 can have multiple slopes, with curvatures and/or linear portions.

The bottom portion 782 and the top portion 784 can be substantially solid extending from the outer surface 786 to the inner surface 88, shaped as a conical shaped solid of revolution around the center pintle axis 30. In other words the bottom portion 782 and top portion 784 can form two conical shaped portions centered around the center pintle axis 30.

The center pintle hub 744 can include a bottom surface 794 located opposite from the first surface 68 and the top surface 92. The bottom surface 794 can be radially defined between the outer circumference 64 and the inner surface 88, and can be oriented to face downwards towards the base 12.

The center pintle hub 744 can include a center protrusion 752. The center protrusion 752 can be located opposite of the top surface 92 and extend outward and downward from the interface between the bottom surface 794 and the inner surface 88. In an embodiment the center protrusion 752 can have a solid frusto conical shape. In an example the center protrusion 752 can have an annulus shape centered with respect to the center pintle axis 30.

Figure 9:
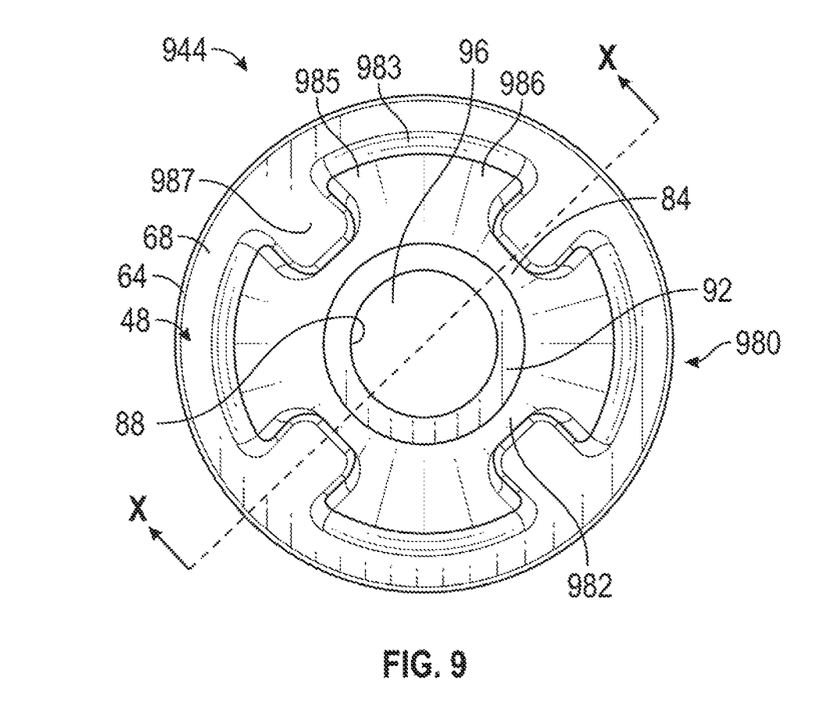
FIG. 9 is a top plan view of another alternative center pintle hub.

FIG. 9 is a top view of a further alternative center pintle hub.

Figure 10:
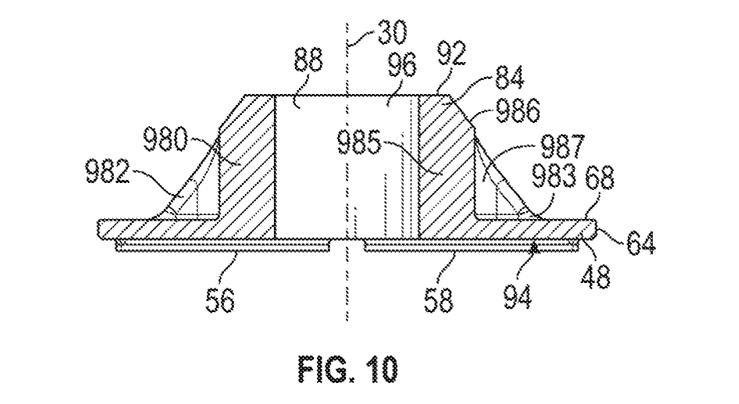
FIG. 10 is a cross-section of the center pintle hub and the base along section line X-X of FIG. 9.

FIG. 10 is a cross-section of the center pintle hub and the base along section line X-X of FIG. 9. Structures and features previously described in connection with earlier described embodiments may not be repeated here with the understanding that, when appropriate, that previous description applies to the embodiment depicted in FIG. 9, as well as FIG. 10. Additionally, the emphasis in the following description is on variations of previously introduced features or elements. Also, some reference numbers for previously descripted features are omitted.

Referring to FIGS. 9 and 10, an alternative center pintle hub 944 can include a base portion 48 and a support portion 980. The support portion 980 can include the top portion 84, an inner portion 985, and outer portions 982. The inner portion 985 can extend from the top portion 84 to the base portion 48. The inner portion 985 can be shaped as a hollow cylinder.

The outer portions 982 can extend outward from the inner portion 985. The outer portions 982 can extend outwards and downwards from the top portion 84 to the base portion 48. In an embodiment there are four outer portions 982. In other examples there can be two, three, four, five, six, seven, eight, or more outer portions 982. The outer portions 982 can be shaped as sections from a cone. The outer portion 982 can be outward of the top portion 84 with respect to the center pintle axis 30.

The support portion 980 can have a transition portion 983. The transition portion 983 can adjoin the outer portion 982 to the base portion 48 along the exposed perimeter of the outer portion 982. The transition portion 983 can adjoin the inner portion 985 to the base portion 48 along the exposed perimeter of the inner portion 985. The transition portion 983 can have a curvature that transitions the slope change from the base portion 48 to the support portion 980, and may have a constant radius.

The outer portions 982 and the inner portion 985 can form indents 987 that extend from the base portion 48 towards the top surface 92. The indents 987 can be the shape difference between the outer portions 982 and a solid truncated conical shape. In an embodiment, there are four indents 987; however there can be one, two, three, four, five, six, or more indents 987.

The support portion 980 can include an outer surface 986 that can extend from the base portion 48 to the top surface 92. The outer surface 986 can face outward from the outer portions 982 and the inner portion 985. The outer surface 986 can have multiple slopes, with curvatures and/or linear portions.

INDUSTRIAL APPLICABILITY

The present disclosure generally applies to a center pintle hub 44 for a machine 10, such as an electric rope shovel. It is understood that the center pintle hub 44 may be used with any stationary or mobile machine known in the art. Such machines may be used in construction, farming, mining, power generation, and/or other like applications. Accordingly, such machines may include, for example, excavators, track-type tractors, wheel loaders, on-road vehicles, off-road vehicles, generator sets, motor graders, or other like machines.

In operation, the swing motors rotatably drive the pinions that are engaged with the swing gear. The frame 14 is supported by the rollers, and hence rotates relative to the base 12. On rotation of the frame 14, the center pintle shaft 46 also rotates relative to the center pintle hub 44. The center pintle hub 44 allows rotation of the center pintle shaft 46 within the support portion 80. The center pintle shaft 46 is disposed in the center pintle hub 44 to counteract the horizontal and vertical forces exerted on the frame 14 during the shovel operation.

The center pintle hub 44 can be a single forged or casted component that includes an inner surface 88 for receiving a center pintle shaft 46 that supports the frame 14 of the machine for rotation relative to the base 12. The center pintle hub 44 can include a support portion 80 with a base portion 48 that radiates from the bottom of the support portion 80. Underneath the center pintle hub 44 are various structures that cab support welded connections.

In embodiments herein, the center pintle hub 44 of the center pintle assembly 40 is welded with the base 12 of the machine 10 to form a unitary support structure for the center pintle shaft 46. The center pintle hub 44 includes the base portion 48 and the support portion 80. The single piece forging of the center pintle hub 44 can eliminate structure failure concerns associated with a component embodying multiple pieces due to elimination of welded joints within the center pintle hub 44. The disclosed center pintle hub 44 is characterized with an increased overall strength and durability and is, hence, less susceptible to fractures.

The disclosed center pintle hub 44 is easy to attach to the base 12 by welding. Compared to existing hub designs, the disclosed center pintle hub 44 provides a regular profile for welding to the base 12. In addition, the disclosed design allows welding of the center pintle hub 44 to the base 12 from accessible locations. For example, referring to FIG. 2 and FIG. 6, the base portion 48 can be welded to the top portion 24 of the base 12, which can be performed conveniently along the outer circumference 64. The protrusions 56, 58, 60, and 62 on the bottom surface 94 are welded to the vertical stiffeners 78 of the base 12. Thus, this allows welding of the center pintle hub 44 to be performed easily while also reducing the time consumed in performing the welding operation.

The protrusions 56, 58, 60, 62, the bottom surface 94, the corner edges 79 of the vertical stiffeners, and the space between, can define rat holes 54. The shape of the structures defines these rat holes 54 and can improve the weld class and the overall fatigue life of the vertical stiffeners 78 of the base 12, the center pintle hub 44, and other components of the machine 10.

Although this invention has been shown and described with respect to detailed embodiments thereof, it will be understood by those skilled in the art that various changes in form and detail thereof may be made without departing from the spirit and scope of the claimed invention. Accordingly, the preceding detailed description is merely exemplary in nature and is not intended to limit the invention or the application and uses of the invention. In particular, the described embodiments are not limited to use in conjunction with a particular type of center pintle assembly 40 or machine 10. For example, the described embodiments may be applied to machines employed in mining, construction, farming, and power generation applications, or any variant thereof. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

It will be understood that the benefits and advantages described above may relate to one embodiment or may relate to several embodiments. The embodiments are not limited to those that have any or all of the stated benefits and advantages.

What is claimed is:

1. A center pintle hub for rotatably receiving a center pintle shaft for a center pintle assembly of a machine having a base, the center pintle hub comprising:
    a base portion formed to be affixed to the base of the machine and having the shape of an annular flange;
    a support portion for supporting the center pintle shaft, extending from the base portion, the support portion being a frusta-conical shape and having:
        a bottom portion located adjacent to the base portion,
        a top portion extending from the bottom portion away from the base portion, the top portion located radially-inward of the bottom portion, the top portion having a top surface located opposite the base portion, and
        a bore extending through the support portion and the base portion, located radially-inward of the top surface and having an inner surface located radially-inward of the top surface and formed to receive the center pintle shaft,
    wherein the support portion includes an outer surface defining the frusta-conical shape extending from the top portion to the bottom portion;
    a transition portion adjoining the base portion and the bottom portion of the support portion and having a curvature that transitions a slope change from the bottom portion to the base portion;
    a bottom surface on the base portion opposite of the top surface of the support portion;
    an annular center protrusion extending from the bottom surface of the base portion away from the support portion adjacent the bore; and
    at least one protrusion, for welding the center pintle hub to the machine base, the at least one protrusion extending from the bottom surface of the base portion away from the support portion, the at least one protrusion circumferentially-arranged about the bore and the center protrusion such to surround the bore and center protrusion.

2. The center pintle hub of claim 1, wherein the at least one protrusion comprises
    a plurality of protrusions extending from the bottom surface away from the support portion and the plurality of protrusions are arranged in a generally square configuration.

3. The center pintle hub of claim 2, wherein the center protrusion has a frusto-conical shape.

4. The center pintle hub of claim 1, wherein the center pintle hub is a single forged piece.

5. The center pintle hub of claim 1, wherein the center pintle hub is a casted piece.

6. A center pintle hub for rotatably receiving a center pintle shaft for a center pintle assembly of a machine, the center pintle hub comprising:
    a base portion having an annular flange shape;
    a support portion extending from the base portion and shaped as a truncated conical shaped solid of revolution, the support portion having:
        a bottom portion boated adjacent to the base portion, and
        a top portion extending from proximate to the bottom portion, the top portion having a top surface located opposite the base portion;
    a bottom surface of the base portion located opposite of the top surface of the support portion;
    an inner surface defining a bore extending through the support portion and the base portion, for receiving the center pintle shaft, located radially-inward of the top surface and extending from adjacent the top surface to adjacent the bottom surface;

a transition portion adjoining the base portion and the bottom portion of the support portion and having a curvature that transitions a slope change from the bottom portion to the base portion;

an annular center protrusion extending from the bottom surface of the base portion away from the support portion adjacent the bore; and at least one protrusion for welding the center pintle hub to the machine, the at least one protrusion extending from the bottom surface of the base portion away from the support portion, that at least one protrusion circumferentially-arranged about the bore and the center protrusion such to surround the bore and center protrusion.

7. The center pintle hub of claim 6, wherein the center protrusion has a frusta-conical shape.

8. The center pintle hub of claim 6, wherein the center pintle hub is a single forged piece.

9. The center pintle hub of claim 6, wherein the center pintle hub is a casted piece.

10. A center pintle hub for rotatably receiving a center pintle shaft for a center pintle assembly of a machine, the center pintle hub comprising:

a base portion in the shape of an annular flange;

a support portion extending from the base portion and having:

a top surface located opposite the base portion, and an outer surface defining a conical shape extending from the top surface to proximate the base portion;

a transition portion adjoining the base portion and the support portion and having a curvature that transitions a slope change from the support portion to the base portion;

a bottom surface of the base portion located opposite of the top surface of the support portion;

an inner surface surrounding a bore for receiving a center pintle shaft extending through the support portion and the base portion from adjacent the top surface to adjacent the bottom surface;

an annular center protrusion extending from the bottom surface of the base portion away from the support portion adjacent the bore; and at least one protrusion for welding the center pintle hub to the machine, the at least one protrusion extending from the bottom surface of the base portion away from the support portion, the at least one protrusion circumferentially-arranged about the bore and the center protrusion such to surround the bore and center protrusion.

11. The center pintle hub of claim 10, wherein the at least one protrusion comprises a plurality of protrusions extending from the bottom surface, and the plurality of protrusions are arranged in a generally square configuration.

12. The center pintle hub of claim 10, wherein the center protrusion has a frusta-conical shape.

13. The center pintle hub of claim 10, wherein the center pintle hub is a single forged piece.

14. The center pintle hub of claim 10, wherein the center pintle hub is a casted piece.

\* \* \* \* \*